United States Patent [19]

George et al.

[11] Patent Number: 4,510,605
[45] Date of Patent: Apr. 9, 1985

[54] DUAL FREQUENCY OPTICAL CAVITY

[75] Inventors: E. Victor George, Livermore; John F. Schipper, Palo Alto, both of Calif.

[73] Assignee: The United States of America as represented by the United States Department of Energy, Washington, D.C.

[21] Appl. No.: 477,456

[22] Filed: Mar. 21, 1983

[51] Int. Cl.³ .............................................. H01S 3/10
[52] U.S. Cl. ...................................... 372/23; 372/97; 372/92; 372/51
[58] Field of Search ....................... 372/23, 51, 55, 92, 372/97, 39; 307/425

[56] References Cited

U.S. PATENT DOCUMENTS

| 3,855,544 | 12/1974 | Bowness | 372/97 |
| 3,855,547 | 12/1974 | Kirk | 372/100 |
| 3,860,888 | 1/1975 | Stephens | 372/16 |
| 4,127,827 | 11/1984 | Barry | 372/22 |

Primary Examiner—James W. Davie
Assistant Examiner—Léon Scott, Jr.
Attorney, Agent, or Firm—L. E. Carnahan; Roger S. Gaither

[57] ABSTRACT

Method and apparatus for generating two distinct laser frequencies in an optical cavity, using a "T" configuration laser cavity and means for intermittently increasing or decreasing the index of refraction n of an associated transmission medium in one arm of the optical cavity to enhance laser action in one arm or the second arm of the cavity.

6 Claims, 4 Drawing Figures

DUAL FREQUENCY OPTICAL CAVITY

The United States Government has rights in this invention pursuant to Contract No. W-7405-ENG-48 between the U.S. Department of Energy and the University of California, for the operation of Lawrence Livermore National Laboratory.

FIELD OF THE INVENTION

This invention relates to laser optical cavities for amplifying two distinct frequencies of radiation.

BACKGROUND OF THE INVENTION

Certain laser applications, such as a Raman laser with controllable suppression of parasitic radiation, disclosed and claimed by E. V. George in co-pending U.S. patent application Ser. No. 473,178 filed Mar. 8, 1983 and assigned to the same assignee, require generation of two predetermined, distinct laser radiation frequencies and propagation of the two beams containing these emanations along substantially the same optical path within the remainder of the laser system.

Dichroic devices such as diffraction gratings can be used to combine distinct frequencies converging on the dichroic device from different directions to produce an output directed along a single optical path; but such devices are often not very efficient. A "bare", partially transmissive mirror, oriented at a predetermined angle to combine two optical beams (transmitted and reflected) converging from different directions can also be employed. However, once again a substantial fraction ($\leq 50\%$) of the energy of at least one of these beams is lost at each pass, and this can be unacceptable in a multipass system.

It would be desirable to provide a method and apparatus for propagating two distinct laser beams along substantially the same optical path while minimizing loss of energy in either beam. It would also be desirable to provide the above referenced method and apparatus where the two distinct frequencies are closely spaced.

SUMMARY OF THE INVENTION

One object of the invention is to provide a method and apparatus for generating two radiation beams of distinct, predetermined frequencies of laser radiation in an optical cavity.

Another object is to provide a method and apparatus for propagating two distinct laser beams along substantially the same optical path.

Still another object of the invention is to provide a method and apparatus for propagating two distinct laser beams along substantially the same optical path while minimizing loss of the energy of the beams.

Yet another object of the invention is to provide a method and apparatus for propagating two distinct laser beams having closed spaced frequencies along substantially the same optical path.

Additional objects, advantages and novel features of the invention will be set forth in part in the description which follows, and in part will become apparent to those skilled in the art upon examination of the following, or may be learned by practice of the invention. The objects and advantages of the invention may be realized and attained by means of the instrumentalities and combinations particularly pointed out in the appended claims.

To achieve the foregoing objects in accordance with the invention, the apparatus in one embodiment may comprise a "T"-shaped optical cavity having two substantially identical 45°-45°-90° prisms of refractive index $n_1$ positioned in the junction of the "T", the prisms' hypotenuse faces being adjacent and parallel to but spaced apart from one another by a gap region that contains a first excitable gas of refractive index $n_2$ in its rest state and $n_2^* > n_2$ in its excited state, with $n_1/n_2 > \sqrt{2}$ and $n_1/n_2^* < \sqrt{2}$. The prisms' hypotenuse faces are oriented at 45° to a horizontal line defined by first and second arms of the "T". A second excitable gas is contained in a first arm of the "T" and is capable of amplifying optical radiation of a predetermined frequency $\nu_2$ when this gas is excited. A third excitable gas is contained in the base of the "T" and is capable of amplifying optical radiation of a predetermined frequency $\nu_1$. Excitation means for each of the three gases are induced for separately, controllably and intermittently exciting each gas. A first mirror is positioned on the exposed vertical face of the arm of the "T" containing the second gas and is substantially 100 percent reflecting for incident radiation of frequency $\nu_2$. A second mirror is positioned on the exposed horizontal face of the base of the "T" and is substantially 100 percent reflecting for incident radiation of frequency $\nu_1$.

In a further aspect of the present invention, in accordance with its objects and purposes, the method for generating two distinct laser frequencies $\nu_1$ and $\nu_2$ in a optical cavity comprises providing a T-shaped optical cavity having two substantially 45°-45°-90° prisms. The prisms are comprised of a material having a refractive index $n_1$ positioned in a junction region of the "T". Each prism has a hypotenuse face adjacent to and parallel to but spaced apart from the other hypotenuse face by a gap region. The hypotenuse faces are oriented at 45° to a horizontal line defined by the arms of the "T". A first gas is introduced into the gap region between the two prisms. The first gas has a predetermined refractive index $n_2$ in its unexcited state and a predetermined refractive index $n_2^* > n_2$ when it is in an electrically or optically excited state, with the refractive indexes $n_1$, $n_2$ and $n_2^*$ satisfying the relations $n_1/n_2 > \sqrt{2}$ and $n_1/n_2^* < \sqrt{2}$. A second gas is introduced into a first arm of the "T". The second gas is capable of amplifying optical radiation of frequency $\nu_2$ when excited. A third gas is introduced into a base of the "T". The third gas is capable of amplifying optical radiation of frequency $\nu_1$ when excited. The first, second and third gases are excited in the "T" and form two distinct laser frequencies $\nu_1$ and $\nu_2$.

The method and apparatus of the present invention provides for the generation of two distinct laser frequencies in an optical cavity with minimal loss of energy in either frequency. It is applicable to the propagation of two laser frequencies which are closely spaced.

BRIEF DESCRIPTION OF THE DRAWINGS

The accompanying drawings, which are incorporated in and form part of the specification, illustrate several embodiments of the invention and, together with the description, serve to explain the principles of the invention.

DETAILED DESCRIPTION OF THE PREFERRED EMBODIMENT

Figure 1:
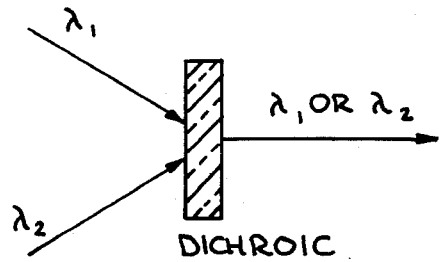
FIG. 1 is a schematic view of a representative, but inefficient, device that can be used to combine and propagate two radiation beams of different frequencies along the same optical path.

In certain applications of lasers, two or more distinct laser frequencies are required in a single optical path. If the frequencies are separated sufficiently ($\Delta\nu' \gtrsim 1000$ cm$^{-1}$), dichroic devices and multiple optical cavities are available to produce such frequencies and to combine them in a single optical path, as suggested in FIG. 1. If high output efficiency is also required, a dichroic device such as a grating may be of little use here as the incident radiation may be scattered into several frequency components, each with its own characteristic angle of scattering, thus lowering the useful output (expressed as a fraction of input) associated with an angle.

When two distinct frequencies are sufficiently closely spaced, a standard dichroic may not be sufficiently discriminating, and other means are required. The present invention is particularly suitable for this situation but is operable for any two distinct frequencies.

Figure 2:
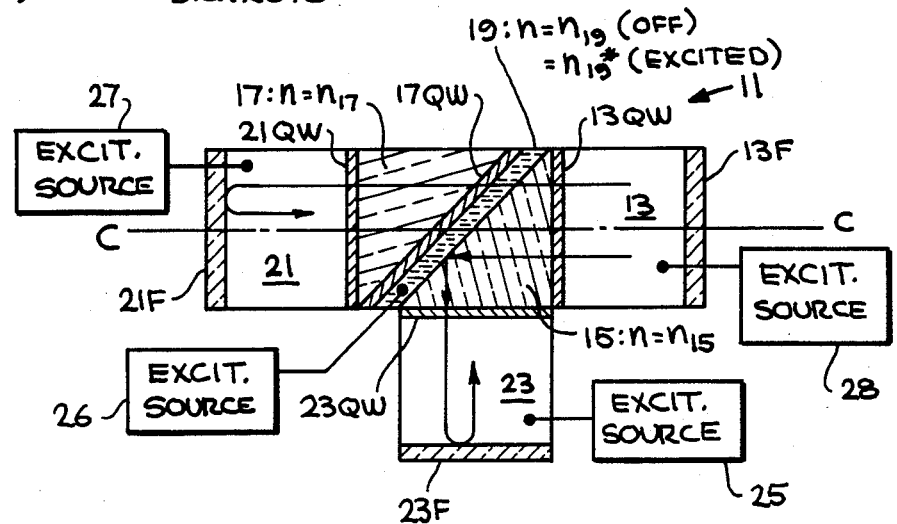
FIG. 2 is a schematic view of one embodiment of the invention, using two spaced apart prisms and an excitable medium therebetween to accomplish beam steering.

In a first embodiment of the invention, shown in FIG. 2, a controllable "T" configuration optical cavity is employed. A dual cavity resonator is included and comprises a first arm cavity 13; substantially identical first and second 45°-45°-90° prisms 15 and 17, which are spaced apart and positioned in the "T" junction region and oriented as shown; a fluid of controllable refractive index $n = n_{19}$ or $n_{19}^*$ occupying a thin gap region 19 between the two facing hypotenuse faces of the prisms 15 and 17; and a second arm cavity 21 and base cavity 23 that are substantially contiguous with one exposed face each of the respective prisms 17 and 15 as shown.

The optical cavity 11 is a T-shaped configuration with the two "arms" 13 and 21 defining a horizontal line (CC) and the hypotenuse faces of the two prisms are parallel, spaced apart a small distance and oriented at 45° relative to the horizontal line. The two "arms" 13 and 21, a "base" 23 and a junction region lying between the two "arms" comprise the "T", and the two prisms 15 and 17 are positioned as shown in the junction of the "T". The cavities 21 and 23 (and, optionally, the front cavity 13) contain gases suitable for amplifying radiation of different frequencies $\nu_2$ and $\nu_1$, respectively.

Figure 3:
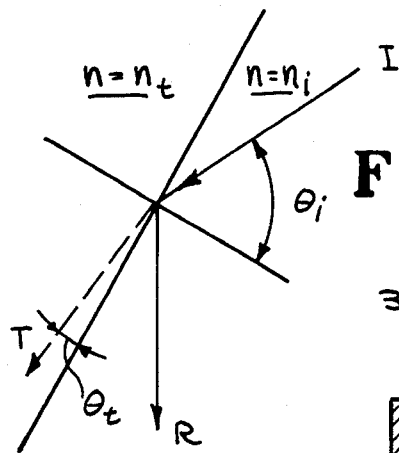
FIG. 3 is a schematic representation of transmitted (T) and reflected (R) components of a radiation beam (I) incident upon an interface between two optically refractive media.

With reference to FIG. 3, it is well-known that, if a (substantially monochromatic) ray of light (I) in a medium with associated refractive index $n = n_i$ is incident upon a locally planar interface between this medium and a medium of refractive index $n = n_t$, and if $n_{rel} = n_i/n_t > 1$, the transmitted component in FIG. 3 will disappear if $$\theta_i > \theta_{cr} = \sin^{-1}\left(\frac{1}{n_{rel}}\right), \tag{1}$$

and substantially all the incident electromagnetic energy will be reflected, with a phase change. This may be verified by use of the Fresnel formulae, derived in M. Born and E. Wolf, Principles of Optics, Pergamon Press, Fifth Edition, 1975, pp. 36–40, for the reflected (R) and transmitted (T) rays, further decomposed into the electromagnetic vector components parallel to ($\|$ or p-wave) and perpendicular to ($\perp$ or s-wave) the plane of incidence of the incident beam ($A_\|$, $A_\perp$), viz.

$$R_\| = \frac{\tan(\theta_i - \theta_t)}{\tan(\theta_i + \theta_t)} A_\|, \tag{2}$$

$$R_\| = -\frac{\sin(\theta_i - \theta_t)}{\sin(\theta_i + \theta_t)} A_\perp,$$

$$T_\| = \frac{2 \sin\theta_t \cos\theta_i}{\sin(\theta_i + \theta_t)\cos(\theta_i - \theta_t)} A_\|,$$

$$T_\perp = \frac{2 \sin\theta_t \cos\theta_i}{\sin(\theta_i + \theta_t)} A_\perp,$$

$$n_i \sin\theta_i = n_t \sin\theta_t.$$

For $\theta_i \leq \theta_{cr}$, $\theta_t = \pi/2$ and the Fresnel relations become $$R_\| = -A_\|,$$

$$R_\perp = A_\perp,$$

$$T_\| = T_\perp = 0$$

Returning now to FIG. 2, if a ray in the cavity 13 parallel to the horizontal line CC is incident upon the prism 15 as shown, the ray passes (at normal incidence) into the prism 15 with little or no reflection; and if the refractive indices $n_{15}$ and $n_{19}$ of the prism 15 and (unactivated) fluid 19 satisfy $$n_r = \frac{n_{15}}{n_{19}} > \sqrt{2} \left(\theta_{cr} < \frac{\pi}{4}\right), \tag{3}$$

the ray is fully reflected at the 15–19 interface and passes (again, at normal incidence) from the prism 15 into the cavity 23 filled with an excited gas suitable for amplifying radiation of the frequency $\nu_1$, where it is amplified and reflected by a fully reflecting mirror 23F positioned on the exposed horizontal face of the base of the "T" and returned along its original path in the opposite direction. If the (substantially monochromatic) ray has wavelength $\lambda_1$, quarter wave plates (or coatings) 13QW and 23QW can be added at each of the two non-hypotenuse faces of the prism 15 through which the ray passes (of thicknesses $\lambda_1/4$ and $\lambda_1/4$ and respective refractive indices $\sqrt{n_{13}n_{15}}$ and $\sqrt{n_{15}n_{23}}^*$) so that substantially zero reflection of the ray energy occurs at these prism faces. With this modification, substantially all radiant energy (of frequency $\nu_1 = c/\lambda_1$) that enters the cavity 13 from the right and parallel to the horizontal line CC passes through 13, 19 and 23, retraces its path in the opposite direction, and exits from the cavity 13 toward the right. If the round trip optical path length within the cavity 11 of such a ray is denoted $2L_1$, the system 13, 13QW, 15, 19, 23QW, 23 functions as a laser optical cavity if $2L_1/\lambda_1 = N_1$ (a positive integer). The cavity 23 is filled with a gas that, in its excited state, is suitable for amplifying light of frequency $\nu_1$, and an excitation source 25 is provided for this gas.

The fluid material contained in the thin space 19 between the two prisms 15 and 17 is chosen so that, in the unactivated state, the fluid refractive index $n_{19}$ satisfies Equation (3), and complete reflection occurs at the 15–19 interface for a light ray incident from the right at 45° to the plane of this interface. The fluid in 19 is also chosen so that, in its optically or electrically activated state, the fluid refractive index $n_{19}^*$ satisfies $$n_{19^*} > n_{15}/\sqrt{2} = n_{17}/\sqrt{2}, \quad (4)$$

(or)

$$n_r = \frac{n_{15}}{n_{19^*}} = \frac{n_{17}}{n_{19^*}} < \sqrt{2} \quad (\theta_{cr} > \pi/4).$$

The fluid in 19 is excited by a first excitation source 25.

With the interstitial fluid 19 in its activated state, a portion of a (substantially monochromatic) ray of light parallel to CC and incident upon the 15–19 interface from the right passes into and through the fluid 19, through the prism 17 into the rear cavity 21, is fully reflected by a 100 percent reflecting mirror 21F positioned on the exposed vertical face of the cavity 32, and passes toward the right through the cavity 21, prism 17, still-activated interstitial fluid 19, prism 15 and cavity 13 and exits toward the right.

If the prism 17 is also provided with optical coatings 17QW and 21QW of thickness $\lambda_2/4\sqrt{2}$ and $\lambda_2/4$ as shown, having respective refractive indices of $\sqrt{n_{17}n_{19}^*}$ and $\sqrt{n_{17}n_{21}^*}$, this last-mentioned ray (of frequency $\nu_2 = c/\lambda_2$) suffers no reflection at the interface 17–21 and only reduced reflection at the interface 17–19; this ray, which travels from right to left substantially parallel to CC and returns by the same route, suffers a small loss in intensity due to partial reflections occurring at the 15–17 and 17–19 interfaces. The cavity 21 is filled with a gas that, in its excited state, is suitable for amplifying light of frequency $\nu_2$; and if the round trip optical path length from 13F to 21F to 13F is denoted $L_2$, the system 13, 13QW, 15, 19, 17QW, 21QW, 21, 21F function as a laser optical cavity if $2L_2/\lambda_2 = N_2$ (a positive integer). The cavity 21 is also provided with an excitation source 27. The cavity 13 can be empty or filled with a gas that is neutral to or supports monochromatic radiation at the frequencies $\nu_1$ and $\nu_2$ and may be optionally electrically or optically connected to another excitation source 28.

The system shown in FIG. 2 thus allows synchronous, or even simultaneous, operation as an amplifier at frequencies $\nu_1$ and $\nu_2$, with both being emitted (toward the right) along the same path.

Another embodiment of the invention uses the same apparatus as shown in FIG. 2 but uses a fluid in the gap region 19 having an index of refraction $n_{19}$ satisfying $$n_{19} \text{ (unactivated)} > n_{15}/\sqrt{2}, \quad (5)$$

-continued $$n_{19}^* \text{ (activated)} < n_{15}/\sqrt{2}.$$

With the fluid in 19 in its unactivated (activated) state, a substantially monochromatic ray of light entering the apparatus 11 from the right is transmitted (reflected) and passes into the cavity 21 (23) for amplification, reflection and return.

Figure 4:
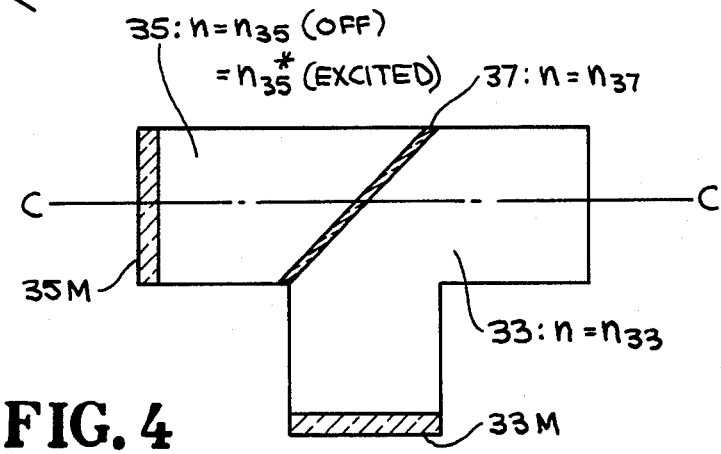
FIG. 4 is a schematic view of an alternative embodiment of the invention, using two optical cavity subregions filled with separately excitable, radiation amplifying gases separated by a plate of predetermined refractive index.

In another embodiment, shown in FIG. 4, two optical regions are utilized instead of three, and one eliminates the pair or prisms used in FIG. 2. The apparatus 31 comprises two optical regions 33 and 35 formed together as a "T", with a thin transparent plate 37 of refractive index $n_{37}$ oriented at 45° to the center line CC, and fully reflective mirrors 33M and 35M at one end of each of the regions 33 and 35, respectively. The cross section of the first optical region 35 is a 45°-135°-90°-90° trapezoid with the slant face (lying between the 45° and 135° angles) being bounded by the transparent contiguous plate 37 of solid material. The second optical region 33, in cross section, is a right corner truncated at the corner by a plane oriented at 45° to the horizontal line CC and also containing the plate 37. Here, the gas in cavity 35 (with refractive index $n_{35}$ in the rest state and index $n_{35}^* > n_{35}$ in the excited state) is chosen to amplify light of frequency $\nu_2$ in the excited state of the medium; and the material of plate 37 has a refractive index satisfying $$n_r = \frac{n_{37}}{n_{35}} > \sqrt{2} \quad \text{(rest state)}$$

$$= \frac{n_{37}}{n_{35}^*} < \sqrt{2} \quad \text{(excited state)},$$

$$n_{33} \quad n_{37}$$

so that again a light ray of frequency $\nu = \nu_2$ is fully reflected at the rear edge of plate 37 only when the medium in cavity 35 is in its rest state. With the medium in the excited state (having refractive index $n_{35}^*$) a portion of light (of frequency $\nu = \nu_2$) is transmitted into the medium in cavity 35 for amplification and reflection, as in FIG. 2. The medium in cavity 33 is chosen to amplify light at frequency $\nu = \nu_1$ as before, with this medium in its excited state.

One substance that is suitable for use as the fluid filling the region 19 is OCSe. In the unexcited state, a refractive index of 1.1 is possible at low temperatures ($\lesssim -20°$ C.); and in a suitable photolyzed state, the refractive index is reduced from that of the unexcited state by at least a few percent, which is sufficient to permit their use as indicated by the requirements of equation (5).

One method of the present invention comprises providing a T-shaped optical cavity having two substantially 45°-45°-90° prisms. The prisms are comprised of a material having a refractive index $n_1$ positioned in a junction region of the "T". Each prism has a hypotenuse face adjacent to and parallel to but spaced apart from the other hypotenuse face by a gap region. The hypotenuse faces are oriented at 45° to a horizontal line defined by the arms of the "T". A first gas is introduced into the gap region between the two prisms. The first gas has a predetermined refractive index $n_2$ in its unexcited state and a predetermined refractive index $n_2^* > n_2$ when it is in an electrically or optically excited state with the refractive indexes $n_1$, $n_2$ and $n_2^*$ satisfying the relations $n_1/n_2 > \sqrt{2}$ and $n_1/n_2^* < \sqrt{2}$. A second gas is introduced into a first arm of the "T". The second gas is capable of amplifying optical radiation of frequency $\nu_2$ when excited. A third gas is introduced into a base of the "T". The third gas is capable of amplifying optical radiation of frequency $\nu_1$ when excited. The first and second gases and the third gas are alternately excited in the "T" and form two distinct laser frequencies $\nu_1$ and $\nu_2$. An alternative method uses a first gas with indices satisfying $n_2^* < n_2$ and a prism material with a refractive index $n_1$, satisfying $n_1/n_2 < \sqrt{2}$ and $n_1/n_2^* > \sqrt{2}$, with all other steps being substantially the same as in the preceding description.

The methods and apparati of the present invention provide for the generation of two distinct laser frequencies in an optical cavity with minimal loss of energy in either frequency. The invention is applicable to the amplification of two laser frequencies which are closely spaced as well as to frequencies that are spaced far apart.

The foregoing description of preferred embodiments of the invention has been presented for purposes of illustration. It is not intended to exhaust or limit the scope of the invention to the precise forms disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. Apparatus for generating two distinct laser frequencies $\nu_1$ and $\nu_2$ in an optical cavity, the apparatus comprising:
   a T-shaped optical cavity comprising two arms, a base and a junction region lying between the two arms and the base and having two substantially 45°-45°-90° prisms of material of refractive index $n_1$ positioned in the junction region of said T-shaped cavity, each prism having a hypotenuse face being adjacent and parallel to but spaced apart from the other by a gap region, with the prisms' hypotenuse faces being oriented at 45° to a horizontal line defined by a first and second arm of said T-shaped cavity;
   a first excitable gas positioned in the gap region between the two prisms and, having a predetermined refractive index $n_2$ in its unexcited state and a predetermined refractive index $n_2^* > n_2$ in its electrically or optically excited state, the refractive indexes $n_1, n_2$ and $n_2^*$ satisfying the relations $n_1/n_2 > \sqrt{2}$ and $n_1/n_2^* < \sqrt{2}$;
   first excitation means for controllably and intermittently exciting the first gas;
   a second excitable gas, contained in the first arm of said T-shaped cavity for amplifying optical radiation of frequency $\nu_2$ when the second gas is excited;
   second excitation means for controllably and intermittently exciting the second gas;
   a third, excitable gas, contained in the base of said T-shaped cavity for amplifying optical radiation of frequency $\nu_1$ when the third gas is excited;
   third excitation means for controllably and intermittently exciting the third gas;
   a first mirror, positioned on an exposed vertical face of the arm of said T-shaped cavity containing the second excitable gas and being substantially 100 percent reflecting for incident optical radiation of frequency $\nu_2$; and
   a second mirror, positioned on an exposed horizontal face of the base of said T-shaped cavity and being substantially 100 percent reflecting for incident optical radiation of frequency $\nu_1$.

2. Apparatus according to claim 1, wherein said prism adjacent to said first arm of said T-shaped cavity containing said second excitable gas has its hypotenuse face covered with an optical coating of thickness $c/4\sqrt{2}\,\nu_2$, where $c$ is the speed of light in vacuum, and having refractive index $n = \sqrt{n_1 n_2^*}$, and said prism having its face adjacent to the first arm of said T-shaped cavity containing the second excitable gas covered with an optical coating of thickness $c/4\nu_2$ and of refractive index $n = \sqrt{n_1 n_3^*}$ where $n_3^*$ is the refractive index of said second excitable gas in its excited state.

3. Apparatus according to claim 1, wherein said second arm of said T-shaped cavity contains a fourth excitable gas that, in its excited state, either amplifies or does not attenuate optical radiation of frequencies $\nu_1$ and $\nu_2$ and a fourth excitation means for excitation of the fourth gas.

4. Apparatus for generating two distinct laser frequencies $\nu_1$ and $\nu_2$ in an optical cavity, comprising:
   a T-shaped optical cavity having a first arm comprising a hollow 45°-135°-90°-90° trapezoid with a slant face of the trapezoid being a solid face transparent plate of refractive index $n_2$, a second arm of said T-shaped cavity and a base of said T-shaped cavity being a hollow, corner-truncated right angle corner having said solid plate of refractive index $n_2$ as a truncation of the corner;
   a first excitable gas contained in said first arm of said T-shaped cavity and having a refractive index $n_1$ in a rest state and $n_1^* > n_1$ in an excited state for amplifying optical radiation of frequency $\nu_1$ when the first gas is in an electrically or optically excited state;
   a second excitable gas, contained in the base of said T-shaped cavity and having a refractive index $n_3$ in a rest state and $n_3^* > n_3$ in an electrically or optically excited state capable of amplifying optical radiation of frequency $\nu_2$ when the second gas is in its excited state, the indices $n_2$, $n_3$ and $n_3^*$ satisfying the relations $n_2/n_3 > \sqrt{2}$ and $n_2/n_3^* < \sqrt{2}$;
   first excitation means for controllably and intermittently exciting the first gas;
   second excitation means for controllably and intermittently exciting the second gas;
   a first mirror, positioned on an exposed vertical face of the first arm of said T-shaped cavity, the first mirror being substantially 100 percent reflecting for incident optical radiation of frequency $\nu_1$; and
   a second mirror, positioned on an exposed horizontal face of the base of said T-shaped cavity, the second mirror being substantially 100 percent reflecting for incident optical radiation of frequency $\nu_2$.

5. A method for generating two distinct laser frequencies $\nu_1$ and $\nu_2$ in an optical cavity, comprising the steps of:
   providing a T-shaped optical cavity having two substantially 45°-45°-90° prisms of a material having a refractive index $n_1$ positioned in a junction region of said T-shaped cavity, each prism having a hypotenuse face adjacent and parallel to but spaced apart from the other hypotenuse face by a gap region, each hypotenuse face being oriented at 45° to a horizontal line defined by a first and a second arm of said T-shaped cavity;

introducing a first excitable gas into the gap region between the two prisms, the first gas having a predetermined refractive index $n_2$ in its unexcited state and a predetermined refractive index $n_2^* > n_2$ in its electrically or optically excited state, the refractive indexes, $n_1$, $n_2$ and $n_2^*$ satisfying the relations $n_1/n_2 > \sqrt{2}$ and $n_1/n_2^* < \sqrt{2}$;

introducing a second excitable gas in said first arm of said T-shaped cavity for amplifying optical radiation of frequency $\nu_2$ when excited;

introducing a third excitable gas into a base of said T-shaped cavity for amplifying optical radiation of frequency $\nu_1$, when excited;

exciting the second gas to generate laser radiation at frequency $\nu_2$; and exciting the first and third gases to generate laser radiation at frequency $\nu_2$.

6. The method for generating two distinct laser frequencies $\nu_1$ and $\nu_2$ in an optical cavity according to claim 5, additionally comprising:

introducing into the second arm of said T-shaped cavity a fourth excitable gas that in its excited state either amplifies or does not attenuate optical radiation of frequencies $\nu_1$ and $\nu_2$; and exciting the fourth gas.

* * * * *